UNITED STATES PATENT OFFICE.

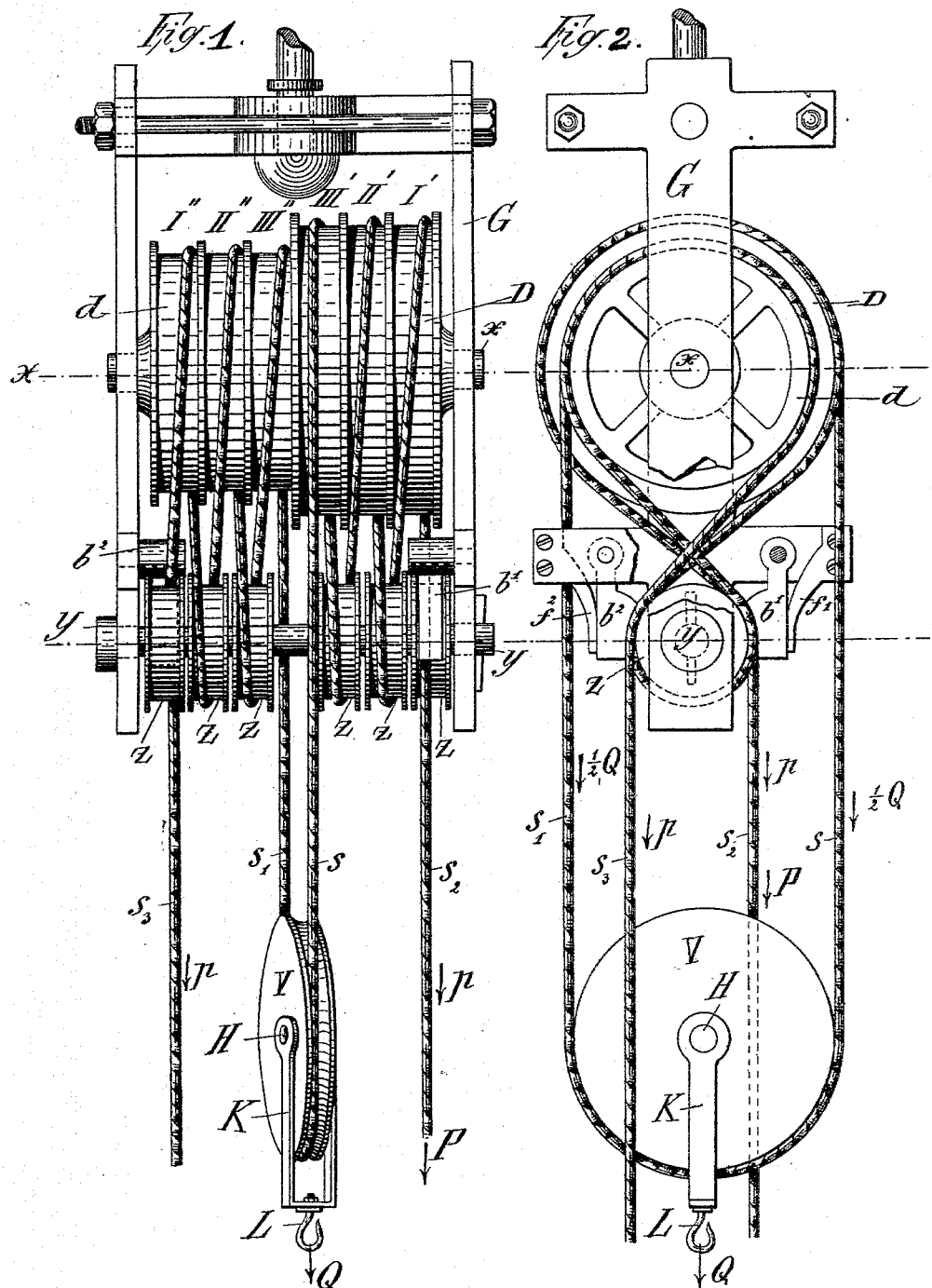

LJUBOMIR KLERITJ, OF BELGRADE, SERVIA.

DIFFERENTIAL PULLEY.

SPECIFICATION forming part of Letters Patent No. 516,098, dated March 6, 1894.

Application filed June 3, 1892. Serial No. 435,421. (No model.)

*To all whom it may concern:*

Be it known that I, LJUBOMIR KLERITJ, a subject of the King of Servia, residing in the city of Belgrade, in the Province of Belgrade, in the Kingdom of Servia, have invented certain new and useful Improvements in Differential Pulleys, of which the following is a specification.

The differential pulleys usually employed for raising and lowering loads and for holding them when raised are usually worked with chains which engage with projections and recesses in the peripheries of the pulleys in such a manner that they do not slip.

My invention relates to the construction and arrangement of differential pulleys in such a manner that they can be worked with ropes instead of chains. For this purpose, instead of making the system consist of a single large and a single small pulley on one axis, I fix several large and several small pulleys say for example three of each, side by side, on the axis with guide pulleys by which the rope is led over the three larger pulleys successively, then under the suspending pulley and from it over the three smaller pulleys successively, then under the suspending pulley and from it over the three smaller pulleys successively. Thus by multiplying the friction of the rope on a number of pulleys I prevent it from slipping. In order to obtain as much friction as possible I arrange the guide pulleys so that the part of the rope passing to each acting pulley crosses the part passing from it, thus causing the rope to embrace nearly the whole circumference.

In the accompanying drawings Figures 1 and 2 represent in front and side view a tackle in which all pulleys are arranged upon a common axle in planes parallel to each other.

The tackle is constructed with differential pulleys arranged parallel to each other which have a common axle or shaft $x$. The pulleys are formed as a differential drum with two diameters, D and $d$, D being larger than $d$. The part of the drum with the larger diameter is divided into a certain number of grooves such as three, as shown in the drawings marked I′ II′ III′, and which are parallel and receive the windings of the endless rope. Also the part with the smaller diameter $d$ is divided into an equal number of grooves I″ II″ III″ in which also runs the endless rope.

In order to prevent a helical or screw-like motion of the rope in an axial direction due to the like winding of the endless rope I employ a corresponding number of guiding pulleys or rollers Z, arranged upon a common stationary axle Y, which guiding-pulleys are also provided with grooves and are usually of equal diameter. In addition I employ a loose pulley V, from the axle H of which is suspended the load Q by means of a fork K and hook L. The travel of the rope is indicated by arrows in Figs. 1 and 2, it runs alternately around the drum and the loose guiding rollers.

The slipping of the loose parts $s^2$ $s^3$ of the rope, when no lifting force works, is prevented by the brake-blocks $b'$ $b^2$ pressed on by the springs $f'$ $f^2$, but as that force is smaller than the weight of the loosely hanging rope $s^2$ $s^3$, the brake-blocks may be dispensed with. The tackle may also be used as differential rope windlass, if the drum is rotated by means of a crank applied to the axle X.

In Fig. 2 the edges of the pulleys which prevent a lateral displacing of the rope are omitted for the sake of clearness.

I claim—

In a rope tackle the combination of differential cylinders or drums with separate guiding pulleys corresponding in number with the number of grooves of the differential drums, said guiding-pulleys being of the same diameter and adapted to slide in the direction of the axis, substantially as described and for the purpose specified.

In testimony whereof I have signed this specification in presence of two subscribing witnesses.

LJUBOMIR KLERITJ.

Witnesses:
  N. B. MURPHY,
  PAUL BERGER.